COLOR TELEVISION RECEIVER WITH AUTOMATIC FREQUENCY CONTROL

Filed Nov. 12, 1952

INVENTOR.
Norman W. Parker
BY Norman L. Mueller
Atty.

2,766,320

COLOR TELEVISION RECEIVER WITH AUTOMATIC FREQUENCY CONTROL

Norman W. Parker, Park Forest, Ill., assignor to Motorola, Inc., Chicago, Ill., a corporation of Illinois Application November 12, 1952, Serial No. 320,057

2 Claims. (Cl. 178—5.4)

Figure 1:
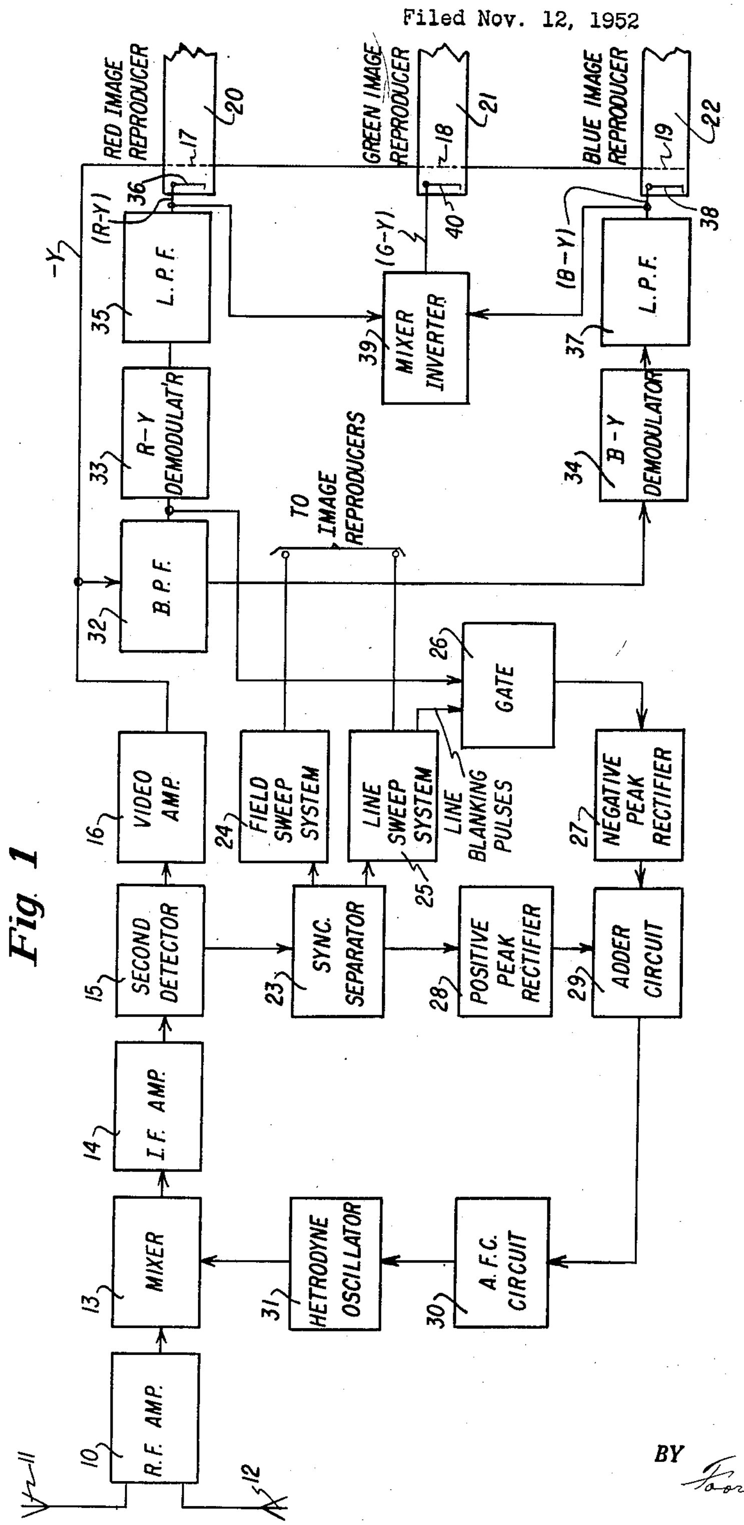

This invention relates to television receivers, and more particularly to a color television receiver of the superheterodyne type in which the heterodyne oscillator is controlled in a new and improved fashion so as to preclude color deterioration in the reproduced image due to frequency variations thereof.

Prior to the advent of inter-carrier sound systems, the instability of the heterodyne oscillator in superheterodyne television receivers presented a problem due to the fact that such instability affected adversely the separation of the picture and sound information which resulted for the most part in deterioration of the reproduced sound. A series of extremely stable oscillators have been used to correct this situation, one for each channel, instead of the usual provision of a single oscillator having a different frequency determining network switched into its circuit for each channel. The proposed improvement was extremely satisfactory in operation, but proved to be unduly expensive.

Since any variation in the frequency of the heterodyne oscillator causes a corresponding variation in the amplitude of the sound carrier at the sound discriminator detector of the receiver, it has also been proposed to equip the heterodyne oscillator with an automatic frequency control circuit actuated by a control signal derived from the sound discriminator. This arrangement was also satisfactory except that due to the limited range of the sound discriminator characteristics it was possible for the heterodyne oscillator to shift completely out of the control range.

As previously noted, the advent of inter-carrier sound solved the problem of heterodyne oscillator instability insofar as monochrome television receivers were concerned since, with such a system, variations in the heterodyne oscillator frequency have little or no effect on the sound and cause only a minor degradation of the picture reproduced. In color receivers, however, mistuning of the heterodyne oscillator has an extremely adverse effect on the reproduced image since it causes color contamination. Therefore, in color television receivers it is again necessary to provide a high degree of stability in the heterodyne oscillator, and which stability will be retained as the oscillator is switched from one channel to another.

In an effort to achieve compatability with existing monochrome television systems, a color television system has been devised in which the various color video signals obtained from a suitable picture converting means are combined in a selected proportion to constitute a monochrome video signal. The monochrome video signal is combined with line and field synchronizing components and associated blanking components, and is then modulated on a main carrier to form a monochrome television signal complying in all respects with present-day monochrome standards so that it may be reproduced in black-and-white in existing receivers. In order that the televised images may be reproduced in color in color television receivers, the various color video signals derived in the system are mixed with the monochrome signal at the transmitter to obtain a series of "color difference" video signals, the latter being modulated on suitable sub-carriers which, in turn, are modulated on the main carrier and disseminated concurrently with the monochrome video signal to the color television receivers. Full details of this type of color television system may be found in the February 1952 edition of Electronics Magazine, published by the McGraw-Hill Corporation, in an article entitled "Principles of NTSC Compatible Color Television," by C. J. Hirsch, et al., at page 88 of that publication.

It is usual practice in the above-mentioned type of color television systems to impress bursts corresponding in frequency and phase to one of the color sub-carriers on the line blanking components of the television signal, these bursts being utilized at the various receivers to demodulate the color sub-carriers. Moreover, it is the practice to maintain a precise relative amplitude between the aforementioned color bursts and the peaks of the synchronizing components in the radiated color television signal. In present day television receivers, the response of the intermediate frequency amplifier is usually such that it slopes in one sense at frequencies corresponding to the frequencies of the synchronizing components and slopes in another sense at frequencies corresponding to the color sub-carrier frequency represented by the aforementioned bursts. Any shift in the frequency of the heterodyne oscillator of the receiver from a selected frequency causes the response of the intermediate frequency amplifier to increase for the synchronizing components and decrease for the color bursts, or to decrease for the synchronizing components and increase for the color bursts, depending upon the direction of the shift. The present invention provides a receiver in which the relative amplitudes of the synchronizing components and the color bursts are compared and, since these relative amplitudes are fixed in the radiated signal, any variation therein represents a shift in the frequency of the heterodyning oscillator so that a control signal developed which represents such variations may be used to control the frequency of that oscillator.

It is, accordingly, an object of the present invention to provide a new and improved color television receiver by means of which a color image may be reproduced with a high degree of color purity.

A further object of the invention is to provide such an improved color television receiver in which the frequency of its heterodyne oscillator is precisely controlled so that oscillator stability is assured even when the receiver is switched from one channel to another.

A feature of the invention is the provision in a color television heterodyne receiver of a circuit which compares certain components of the color television signal as translated by the receiver to produce a control signal having variations representing frequency variations in the heterodyne oscillator, and for using the control signal precisely to maintain the oscillator at a selected frequency.

Figure 2:
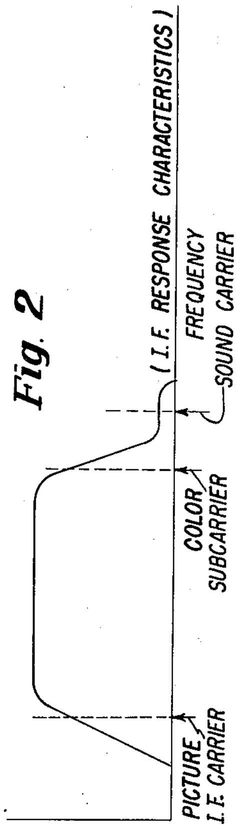

The above and other features of the invention which are believed to be new are set forth with particularity in the appended claims. The invention itself, however, together with further objects and advantages thereof may best be understood by reference to the accompanying drawings in which:

Fig. 1 shows a color television receiver constructed in accordance with the invention, and Fig. 2 comprises the response curve of the intermediate frequency amplifier of the receiver useful in explaining the functioning of the invention.

The receiver of this invention utilizes a composite signal having at least two components with a fixed amplitude relation and frequency displacement. The receiver includes an amplifier for translating the composite signal and having a response characteristic sloping in one sense at a frequency corresponding to the frequency of one of the aforementioned signal components and sloping in another sense at a frequency corresponding to the frequency of the other aforementioned signal component. Circuit means are provided for deriving each of the signal components from the amplifier. A first network is coupled to the circuit means and responds to one of the signal components from the amplifier for producing a first control signal having amplitude variations corresponding to amplitude variations in such signal component, and a second network is coupled to the circuit means and responds to the other of the signal components from the amplifier for producing a second control signal having amplitude variations corresponding to amplitude variations in such other signal components. Finally, means is provided for comparing the first and second signal components to produce a control potential having amplitude variations corresponding to variations in the relative amplitudes of the signal components derived from the amplifier, the control potential being utilized to control the frequency of the heterodyne oscillator of the receiver.

The receiver of Fig. 1 includes a radio frequency amplifier 10 having input terminals connected to an appropriate antenna 11 and 12 and having output terminals connected through mixer 13 to an intermediate frequency amplifier 14. The intermediate frequency amplifier is coupled through a second detector 15 and a video amplifier 16 to control electrodes 17, 18 and 19 of image reproducers 20, 21 and 22. Reproducer 20 is utilized to recover the red image, reproducer 21 is used to recover the green image, and reproducer 22 is used to reproduce the blue image. In accordance with well known practice, the reproduced images are combined optically to synthesize a single image in full color. It is apparent that the image reproducers may be combined, in accordance with established techniques, in a single reproducing device.

Second detector 15 is connected to a synchronizing signal separator 23 which, in turn, is connected to a field sweep system 24 and to a line sweep system 25, the sweep systems being respectively coupled to the beam deflection elements of reproducers 20—22. Line sweep system 25 supplies line blanking pulses to a gate 26 to recover the aforementioned color bursts impressed on the line blanking pulses, as previously mentioned. The input terminals of gate 26 are connected to a band-pass filter 32, and the output terminals of the gate are connected to a negative peak rectifier 27. Synchronizing signal separator 23 is further connected to a positive peak rectifier 28 and supplies the field and line synchronizing components thereto. The peak rectifiers 27 and 28 are coupled to an adder circuit 29 which, in turn, is connected to an automatic frequency control circuit 30. Automatic frequency control circuit 30 is coupled to a heterodyne oscillator 31 which, in turn, is coupled to mixer 13 to supply a heterodyne signal to the mixer.

The output terminals of video amplifier 16 are coupled through band-pass filter 32 to a demodulator 33 and to a demodulator 34. Demodulator 33 is coupled through a low-pass filter 35 to the cathode 36 of image reproducer 20, and demodulator 34 is connected through a low-pass filter 37 to the cathode 38 of reproducer 22. Filters 35 and 37 are also connected to a mixer inverter 39 which is connected to the cathode 40 of reproducer 21.

The color television signal utilized by the receiver of Fig. 1 includes, as previously mentioned, a monochrome video signal (*y*) in which the various colors of the televised scene are combined in a selected proportion, and also includes line and field synchronizing components pedestalled on associated line and field blanking components; the video, synchronizing and blanking components being modulated on a main carrier. A first color difference sub-carrier of a selected frequency and phase and having red minus monochrome (*r—y*) color information modulated thereon is modulated on the main carrier, and a second color sub-carrier of the same frequency as the first sub-carrier but in phase quadrature therewith and having blue minus monochrome (*b—y*) color information modulated thereon is also modulated on the main carrier. The color television signal also includes bursts of color sub-carrier corresponding in frequency and phase to the (*r—y*) sub-carrier impressed on the line blanking components.

The aforementioned color television signal is intercepted by the antenna circuit 11, 12 and amplified in radio frequency amplifier 10. The amplified signal is heterodyned to the selected intermediate frequency of the receiver in mixer 13 in response to a heterodyning signal of selected frequency from heterodyne oscillator 31. The resulting intermediate frequency signal is amplified in intermediate frequency amplifier 14 and detected in second detector 15 to produce a composite monochrome video signal. The composite monochrome video signal is amplified in video amplifier 16 and supplied to control electrodes 17, 18 and 19 of the image reproducers. The composite signal from video amplifier 16 also includes the color-difference sub-carriers, but the sub-carriers have such a frequency that even though they are applied to the control electrodes 17—19 have little effect on the reproduced images.

The color sub-carriers are selected by band-pass filter 32, the (*r—y*) sub-carrier being demodulated in demodulator 33 and the (*b—y*) sub-carrier being demodulated in demodulator 34 in known fashion. The (*r—y*) modulation components from demodulator 33 are translated by low-pass filter 35 and supplied to cathode 36 so that the net modulation of the cathode-ray beam in reproducer 20 is in accordance with the red picture information. Likewise, the (*b—y*) modulation components from demodulator 34 are translated by low-pass filter 37 to cathode 38 so that the resultant modulation of the cathode ray beam in reproducer 22 is in accordance with the blue information. The (*r—y*) and (*b—y*) modulation components from filters 35 and 37 are combined in known fashion, and as explained in the Electronics article by Hirsch previously referred to, in mixer inverter 39 to produce color components (*g—y*) representing the difference between the green and the monochrome color information. These latter components are supplied to cathode 40 so that the cathode ray beam of reproducer 21 has a net modulation in accordance with the green color information. In this fashion, reproducer 20 reproduces the red image, reproducer 21 the green image and reproducer 22 the blue image, and these images may be combined optically for full color reproduction.

The line and field synchronizing components of the received color television signal are separated therefrom in separator 23 and supplied respectively to field sweep system 24 and line sweep system 25, the sweep systems controlling the line and field deflection of the image reproducers in known fashion. The line sweep system 25 also develops in known fashion, pulses corresponding in time to the line blanking components, and these pulses are supplied to gate 26 to open the gate in time coincidence with the aforementioned color bursts in the television signal so that these bursts may be supplied to negative peak rectifier 27. Gate 26 may be of any well known type in which an electron discharge device is biased so that the signal from video amplifier 16 is translated to peak rectifier 27 only when such bias is overcome by the pulses from line sweep system 25. The line and field synchronizing components from separator 23 are also supplied to positive peak rectifier 28. Peak rectifier 27 responds in known fashion to the peak amplitude of the color bursts supplied thereto to develop a first control signal of negative polarity having amplitude variations corresponding to variation in the peak amplitude of the color bursts. Likewise, peak rectifier 28 operates in known fashion to produce a positive control signal having amplitude variations corresponding to amplitude variations in the peaks of the synchronizing components supplied thereto. The control signals from rectifiers 27 and 28 are supplied to adder circuit 29 which functions in known manner to compare these control signals and produce a control potential varying through a zero axis in a positive or negative direction as the amplitudes of the control signals from the peak rectifiers vary with respect to one another. The control potential from circuit 29 is supplied to automatic frequency control circuit 30 which is constructed in well-known manner to control the frequency of heterodyne oscillator 31 in accordance with the control potential supplied thereto from the adder circuit.

As shown in Fig. 2, the intermediate frequency amplifier 14 is constructed to have an overall response characteristic sloping in one sense at the selected intermediate frequency of the picture carrier, and sloping in another sense at the frequency of the color sub-carrier. The response characteristic is such that, in accordance with intercarrier sound principles, the amplifier accepts the intermediate frequency sound carrier but with decreased response. The major side bands of the synchronizing components are grouped adjacent the picture carrier, and any shift in the heterodyne oscillator to increase the frequency of the intermediate frequency picture carrier causes increased response thereto and to the synchronizing components by the intermediate frequency amplifier with a resulting increased amplitude in the synchronizing components derived by the synchronizing signal separator and supplied to peak rectifier 28. At the same time, due to the configuration of the response curve of intermediate frequency amplifier, the aforementioned shift in the heterodyne oscillator frequency causes the response of the amplifier to the color sub-carrier frequency to decrease so that the amplitude of the bursts derived by gate circuit 26 and supplied to peak rectifier 27 is decreased. This action causes an increase in the control signal supplied to adder circuit 29 from rectifier 28 and a decrease in the control signal supplied to the adder circuit from rectifier 27 resulting in an amplitude variation from zero in a positive sense in the control potential supplied by the adder to the automatic frequency control circuit 30. The circuit 30 can be constructed so that such a variation in the control potential applied thereto causes a compensating variation in the frequency of the heterodyne oscillator 31 to restore the intermediate frequency signal translated by the intermediate frequency signal translated by the intermediate frequency to the proper frequency. Likewise, any decrease in the frequency of the intermediate frequency signal due to an opposite shift in the frequency of the heterodyne oscillator causes the control potential from adder 29 to increase from zero in a negative sense so that a control can be exerted on the oscillator to restore the proper frequency.

In most television receivers it is usual to provide an automatic gain control circuit which responds to the synchronizing components to control the gain of the intermediate frequency amplifier. However, such a control does not affect adversely the operation of the present invention for even though it tends to maintain the amplitude of the synchronizing components applied to peak rectifier 28 at a fixed value, correspondingly greater variations occur in the negative control signal from peak rectifier 27.

The structural details of all of the components of the television receiver of Fig. 1 shown in block form are believed to be in themselves extremely well known to the art and a detailed description thereof is believed to be unnecessary. Circuits suitable for peak rectifiers 27 and 28, adder 29 and AFC circuit 30 may be found, for example, at page 655 of Terman's Radio Engineer's Handbook, 1st edition (1943), published by McGraw-Hill.

The invention provides, therefore, a television receiver in which a control is exerted on the heterodyne oscillator so that the intermediate frequency signal developed in the receiver is maintained precisely at a desired frequency to obviate deterioration in the reproduction of the receiver.

While a particular embodiment of the invention has been shown and described, modifications may be made, and it is intended in the appended claims to cover all such modifications as fall within the true spirit and scope of the invention.

I claim:

1. In a television receiver for utilizing a color television carrier wave amplitude modulated in accordance with synchronizing components of a selected repetition frequency and further amplitude modulated by bursts of a color synchronizing signal having a selected frequency different from the repetition frequency of said synchronizing components and having a fixed amplitude and timing with respect to said synchronizing components, said receiver comprising, a mixer circuit for heterodyning the television carrier wave to a selected intermediate frequency signal, and a heterodyne oscillator for supplying a heterodyning signal to said mixer, said intermediate frequency signal including an intermediate frequency picture carrier with the major side bands of said synchronizing components grouped adjacent thereto and further having a side band frequency-displaced from the intermediate frequency carrier an amount greater than the side bands of the synchronizing components and representing said color synchronizing bursts; the combination of an intermediate frequency amplifier for amplifying the intermediate frequency signal from said mixer and having a response characteristic sloping in one sense at the frequency of said intermediate frequency picture carrier and in the other sense at a frequency corresponding to said side band representing said color synchronizing bursts; first circuit means coupled to said intermediate frequency amplifier for deriving the synchronizing components from the intermediate frequency signal amplified by said amplifier; second circuit means coupled to said first circuit means for deriving the color synchronizing signal bursts from the intermediate frequency signal amplified by said amplifier; a first peak rectifier circuit coupled to said first circuit means and responsive to the synchronizing components amplified by said intermediate frequency amplifier for developing a unidirectional control potential of a first polarity having amplitude variation corresponding to variations in the peak amplitude of the amplified synchronizing components; a second peak rectifier circuit coupled to said second circuit means and responsive to the color synchronizing signal bursts amplified by said intermediate frequency amplifier for developing unidirectional control potential of a second polarity having amplitude variations corresponding to variations in the peak amplitude of the amplified color synchronizing signal bursts; an automatic frequency control circuit coupled to said heterodyne oscillator for controlling the frequency thereof in accordance with variations in an applied signal; and an adder circuit responsive to the first and second mentioned unidirectional control signals for developing a third control signal varying in accordance with variations in the relative amplitudes of said amplified synchronzing components and said amplified color synchronizing signal bursts from said intermediate frequency amplifier and for applying said third control signal to said automatic frequency control circuit precisely to maintain said heterodyne oscillator at a selected frequency.

2. In a television receiver for utilizing a color television carrier wave amplitude modulated in accordance with synchronizing components of a selected repetition frequency and in accordance with bursts of a color synchronizing signal having a selected frequency different from the repetition frequency of said synchronizing component and said bursts having a predetermined amplitude and timing relation with said synchronizing components, said receiver comprising, a mixer circuit for heterodyning the television carrier wave to a selected intermediate frequency signal, and a heterodyne oscillator for supplying a heterodyning signal to said mixer, said intermediate frequency signal having an intermediate frequency picture carrier with the major side bands of said synchronizing components grouped adjacent thereto and further having a side band frequency-displaced from the intermediate frequency picture carrier by an amount greater than the major synchronizing components side bands and representing said color synchronizing bursts; the combination of an intermediate frequency amplifier for amplifying the intermediate frequency signal from said mixer and having a response characteristic sloping in one sense at the frequency of said intermediate frequency picture carrier and sloping in the other sense at the frequency of said side band representing said color synchronizing signal bursts; circuit means including a second detector coupled to said intermediate frequency amplifier for deriving a composite video signal which includes said synchronizing components and said color synchronizing signal bursts; a synchronizing signal separator coupled to said circuit means for deriving the synchronizing components; a band pass filter coupled to said circuit means for deriving the color synchronizing signal bursts and other components of the color television signal; a gate circuit coupled to said band pass filter and actuated by said synchronizing components to select said color synchronizing signal bursts from said other components; a first peak rectifier coupled to said synchronizing separator and responsive to the synchronizing components therefrom for developing a unidirectional control potential of a first polarity having amplitude variations corresponding to variations in the peak amplitude of the synchronizing components as amplified by said intermediate frequency amplifier; a second peak rectifier network coupled to said gate circuit and responsive to the color synchronizing signal bursts for developing a unidirectional control potential of a second polarity having amplitude variations corresponding to variations in the peak amplitude of the color synchronizing signal bursts as amplified by said intermediate frequency amplifier; an automatic frequency control circuit coupled to said heterodyne oscillator for controlling the frequency thereof in accordance with variations in an applied signal; and an adder circuit responsive to the first and second mentioned unidirectional control signals for developing a third control signal varying in a positive and negative sense in accordance with variations in the relative amplitudes of said amplified synchronizing components and said amplified color synchronizing signal bursts from said intermediate frequency amplifier and for applying said third control signal to said automatic frequency control circuit precisely to maintain said heterodyne oscillator at a selected frequency.

References Cited in the file of this patent

UNITED STATES PATENTS

| | | |
|---|---|---|
| 2,481,902 | Bradley | Sept. 13, 1949 |
| 2,594,380 | Barton | Apr. 29, 1952 |
| 2,714,132 | Fredendall | July 26, 1955 |